United States Patent [19]

Inoue

[11] Patent Number: 5,146,837
[45] Date of Patent: Sep. 15, 1992

[54] REACTION TRANSMITTING MECHANISM OF BRAKE BOOSTER

[75] Inventor: Yoshimichi Inoue, Saitama, Japan

[73] Assignee: Jidosha Kiki Co., Ltd., Tokyo, Japan

[21] Appl. No.: 788,045

[22] Filed: Nov. 5, 1991

[30] Foreign Application Priority Data

Nov. 22, 1990 [JP] Japan .................. 2-12257[U]

[51] Int. Cl.⁵ .................................................. F15B 9/10
[52] U.S. Cl. ................................. 91/369.2; 91/369.3; 91/376 R; 92/99
[58] Field of Search ................. 91/369.1, 369.2, 369, 91/3, 376 R; 92/98 R, 99

[56] References Cited

U.S. PATENT DOCUMENTS

| | | | |
|---|---|---|---|
| Re. 26,487 | 11/1968 | French | 91/369.2 |
| 2,985,143 | 5/1961 | Stelzer | 91/376 R |
| 4,611,526 | 9/1986 | Arino et al. | 91/369.2 |
| 4,794,844 | 1/1989 | Taft | 91/376 R |
| 5,096,267 | 3/1992 | Volz | 91/369.1 |

FOREIGN PATENT DOCUMENTS

| | | | |
|---|---|---|---|
| 3445913 | 6/1986 | Fed. Rep. of Germany | 91/369.1 |
| 2074270 | 10/1981 | United Kingdom | 91/369.2 |
| 2112886 | 7/1983 | United Kingdom | 91/369.2 |

*Primary Examiner*—Edward K. Look
*Assistant Examiner*—Hoang Nguyen
*Attorney, Agent, or Firm*—Flynn, Thiel, Boutell & Tanis

[57] ABSTRACT

A reaction transmitting mechanism for brake booster in which a reaction from an output shaft is transmitted to an input shaft through a reaction disc, a reaction transmitting member and a valve plunger. An annular member is fitted over the valve body, and is formed with a stepped opening, in which a stepped tubular reaction transmitting member is slidably fitted. The reaction transmitting member is formed with a through-opening, in which the front end of the valve plunger is slidably fitted. The right end face of the flange-like portion of the reaction transmitting member is disposed in opposing relationship with the valve body and the step in the valve plunger. As a result of such arrangement, a more free choice of servo ratios used upon actuating and releasing the brake is allowed as compared with the choice enabled in the prior art.

5 Claims, 3 Drawing Sheets

REACTION TRANSMITTING MECHANISM OF BRAKE BOOSTER

FIELD OF THE INVENTION

The invention relates to a reaction transmitting mechanism of brake booster, and more particularly, to such reaction transmitting mechanism for a brake booster in which a reaction from an output shaft is transmitted to an input shaft through a reaction disc and a valve plunger.

DESCRIPTION OF THE PRIOR ART

Generally, a brake booster comprises a valve mechanism which is responsive to a back-and-forth movement of a valve plunger which is mechanically coupled to an input shaft to exercise a controlling action upon opening or closing a flow path for a pressure fluid, an output shaft having its one end slidably fitted in a valve body in which the valve mechanism is received, and a reaction disc interposed between the described end of the output shaft and the valve plunger, a reaction to the output applied to the output shaft being transmitted to the input shaft through the reaction disc and the valve plunger.

In a brake booster of the kind described, it is recognized that there is a slight difference in the magnitude of the output, due to the hysteresis, between when an input of a given magnitude is applied in actuating the brake and when an input of the same value is applied when releasing the brake. Because the difference in the magnitude of the output between the both situations is minimal, it has been impossible to freely alter a servo ratio between the actuation of the brake and the release of the brake.

To accommodate for this, there has been proposed a reaction transmitting mechanism for brake booster in which an annular reaction transmitting member is slidably disposed on the valve body and is interposed between the reaction disc and the valve plunger so that upon actuating the brake, the inner periphery of the reaction transmitting member may be brought into engagement with the valve plunger to transmit a reaction from the reaction disc to the valve plunger and in which upon releasing the brake, the outer periphery of the reaction transmitting member is brought into engagement with the valve body to transmit a reaction from the reaction disc to the valve body (see U.S. Pat. No. 4,611,526).

With a reaction transmitting member for brake booster constructed in the manner mentioned above, the reaction which is transmitted from the reaction disc to the reaction transmitting member is transmitted to the input shaft through the valve plunger when actuating the brake, and is transmitted to the valve body when releasing the brake, rather than being transmitted to the input shaft, thereby allowing the servo ratio to be significantly altered between the actuation and the release of the brake.

FIG. 3 graphically shows a characteristic curve of such a brake booster. Upon actuating the brake, a small servo ratio as indicated by a straight line A is obtained while a greater servo ratio is obtained when releasing the brake, as indicated by dotted lines B. During the actuation of the brake, if the force with which a brake pedal is depressed is maintained constant at point a, representing an intermediate loaded condition, and then the force to depress the brake is reduced, the brake output will decrease with a 1:1 relationship with respect to the input, as indicated by dotted lines C, followed by a more rapid decrease with a greater servo ratio, as indicated by dotted lines B.

As a consequence, when stopping a vehicle by depressing a brake pedal, for example, if the force with which a brake pedal is depressed is reduced unconsciously immediately before the vehicle is stopped, the output will exhibit a reduction with a 1:1 rate with respect to the input, and hence the rate of reduction in the output will be reduced as compared with that achieved with the conventional brake booster in which the rate follows the straight line A. This means that if the force of depressing the brake pedal is unconsciously reduced immediately before the vehicle is stopped, a satisfactory brake feeling can be obtained without producing a sense of shortage in the braking effort.

However, in the reaction transmitting mechanism as mentioned above, it is required that the annular reaction transmitting member has its inner periphery formed with a portion which is engageable with the value plunger and its outer periphery formed with a portion which is engageable with the valve body, thus requiring a given radial dimension. On the other hand, the magnitude of the reaction which is transmitted from the reaction disc to the reaction transmitting member is determined by the area of contact, which corresponds to such radial dimension or width.

Accordingly, when it is desired to maintain the reaction transmitted from the reaction disc to the reaction transmitting member small, meaning that a difference in the servo ratio between the actuation and the release of the brake be established relatively small, as illustrated by a straight line D as shown in FIG. 3, it becomes necessary to choose a small width for the annular reaction transmitting member. however, as mentioned above, the radial width cannot be reduced beyond a given limit inasmuch as the annular reaction transmitting member must have its inner periphery formed with a portion engageable with the valve plunger and its outer periphery formed with a portion engageable with the valve body.

As a consequence, when the force of depressing a brake pedal is increased at point b on the dotted lines B, for example, the output will increase with a 1:1 correspondence with respect to an increase in the input, as indicated by the dotted lines C, and the output will be boosted along the straight line A from the point a. Accordingly, if the servo ratio upon actuating the brake differs greatly from the servo ratio used upon releasing the brake, the points b and a will be spaced apart considerably, and the output will only increase in 1:1 relationship with respect to the input between these points, producing an uneasy sensation in the manner in which the output increases to degrade a brake feeling.

SUMMARY OF THE INVENTION

In view of the foregoing, it is an object of the invention to enable a free choice of a difference in the servo ratios employed upon actuating and releasing the brake in the reaction transmitting mechanism for brake booster which utilizes the annular reaction transmitting member as mentioned above.

Specifically, in accordance with the invention, the reaction transmitting member comprises a tubular portion engageable with the valve plunger, and a flange-like portion extending radially outward from the other end of the tubular portion opposite from the reaction disc and engageable with the valve body. An annular member is mounted on the valve body and is interposed between the reaction disc and the flange-like portion of the reaction transmitting member, and includes a covering which covers the flange-like portion, and a through-opening in which the tubular portion of the reaction transmitting member is slidably fitted.

With the described arrangement, the flange-like portion engageable with the valve body which represents the outer periphery of the reaction transmitting member is covered by the covering of the annular member mounted on the valve body, so that a reaction which tends to be transmitted from the reaction disc to the flange-like portion of the reaction transmitting member will be reacted by the valve body through the covering on the annular member, whereby the reaction from the reaction disc will be only transmitted to the tubular portion of the reaction transmitting member.

Consequently, if the reaction transmitting member has an increased radial width in the region of the flange-like portion, the magnitude of the reaction which is transmitted from the reaction disc to the reaction transmitting member can be freely established in accordance with the size of the tubular portion, or the magnitude of the area of contact between the tubular portion and the reaction disc, thus allowing a difference in the servo ratios used during the actuation and the release of the brake to be arbitrarily established.

Above and other objects, features and advantages of the invention will become apparent from the following description of an embodiment thereof with reference to the attached drawings.

DETAILED DESCRIPTION OF EMBODIMENT

Figure 1:
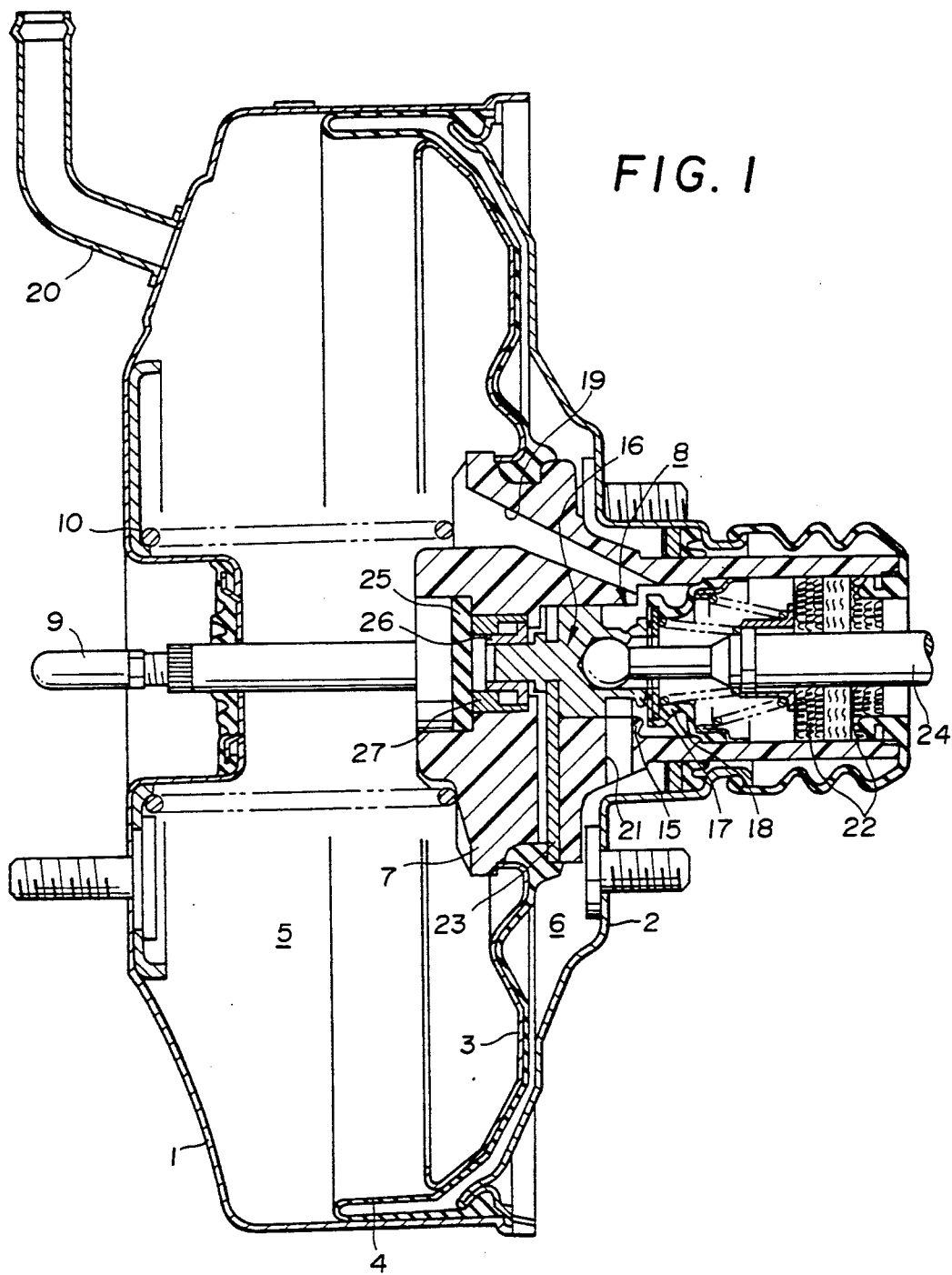
FIG. 1 is a schematic view, generally in longitudinal section, of one embodiment of the invention.

Referring to FIG. 1, a front shell 1 and a rear shell 2 are joined together to define an enclosed vessel in which are disposed a power piston 3 and a diaphragm 4 which is applied to the back surface of the piston 3, the combination of the power piston 3 and the diaphragm 4 dividing the interior of the vessel into a forwardly located, constant pressure chamber 5 and a rearwardly located, variable pressure chamber 6.

An axial portion of the power piston 3 is integrally formed with a valve body 7, which receives a valve mechanism 8 switching a fluid circuit therein. An output shaft or push rod 9 has its one end slidably fitted into and carried by the valve body 7. The piston 3 and the valve body 7 are normally maintained in their inoperative positions, shown, by a return spring 10.

The valve mechanism 8 comprises a first valve seat 15 formed on the valve body 7, a second valve seat 17 formed on a valve plunger 16, and a valve element 18 adapted to be seated upon either valve seat 15 or 17 from right, as viewed in the drawing. A space located radially outward of the first valve seat 15 communicates with the constant pressure chamber 5 through a passage 19 formed in the valve body 7, and thence communicates with a source of negative pressure such as an intake manifold of an engine, not shown, through a tubing 20 which is mounted on the front shell 1 for introducing a negative pressure. A space located radially intermediate between the first and the second valve seat 15, 17 communicates with the variable pressure chamber 6 through a passage 21 also formed in the valve body 7. Finally, a space located radially inward of the second valve seat 17 communicates with the atmosphere through a filter 22.

The withdrawal of the valve plunger 16 from within the valve body 7 is prevented by a key member 23, and the valve plunger is connected to an input shaft 24 which is mechanically coupled to a brake pedal, not shown. The front end face of the valve plunger 16 is disposed in opposing relationship with one end face of a reaction disc 25 which has its other end face disposed in opposing relationship with the one end of the push rod 9.

Figure 2:
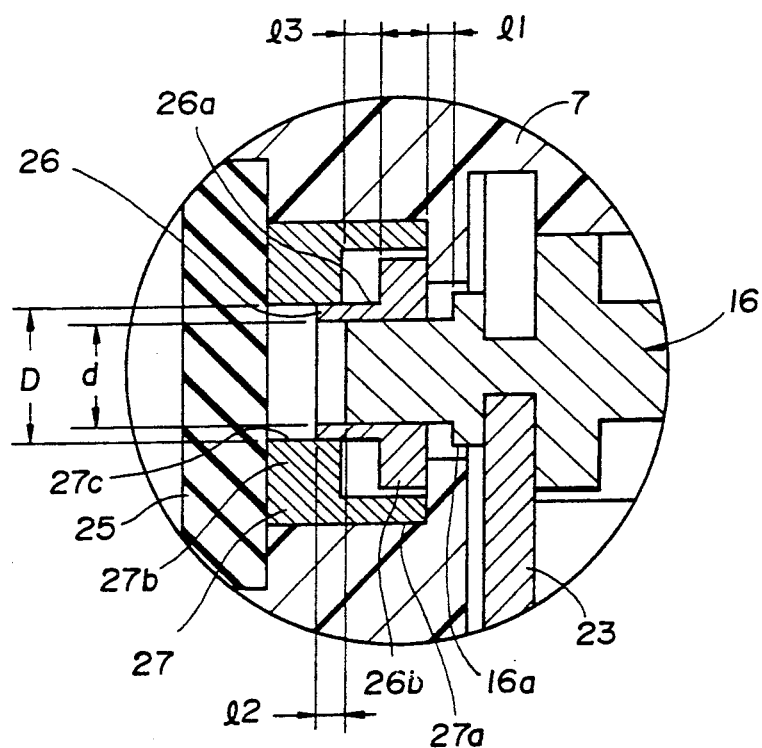
FIG. 2 is an enlarged section of part shown in FIG. 1.

As shown in enlarged form in FIG. 2, a reaction transmitting member 26 is interposed between the valve body 7 and the valve plunger 16 on one hand and the reaction disc 25 on the other. The reaction transmitting member 26 is an annular member having an L-shaped cross section. It includes a tubular portion 26a, representing the inner peripheral portion of the member 26 and into which the front end of the valve plunger 16 is slidably fitted, and a flange-like portion 26b extending radially outward from the right end of the tubular portion 26a.

The right end face of the tubular portion 26a or inner peripheral portion of the right end face of the flange-like portion 26b is disposed opposite to a step 16a formed in the valve plunger 16, and the outer peripheral portion of the right end face of the flange-like portion 26b is disposed opposite to the valve body 7. In the inoperative condition of the brake booster when the outer peripheral portion of the right end face of the flange-like portion 26b is disposed in abutment against the valve body 7, a given clearance $l_1$ is formed between the inner peripheral portion of the right end face of the flange-like portion 26b and the step 16a of the valve plunger 16, and a given spacing $l_2$ is formed between the left end face of the tubular portion 26a and the left end face of the valve plunger 16.

The clearance $l_1$ between the right end face of the flange-like portion 26b and the step 16a of the valve plunger 16 is chosen to allow a contact between the reaction transmitting member 16 and the valve plunger 16 when the valve plunger 16 is advanced to cause the valve element 18 to be seated upon the first valve seat 15, but before the second valve seat 17 moves away from the valve element 18. The distance $l_2$ between the left end face of the tubular portion 26a and the left end face of the valve plunger 16 is chosen to be substantially coincident with the clearance $l_1$ so that when the right end face of the flange-like portion 26b abuts against the step 16a of the valve plunger 16, the left end face of the tubular portion 26a is substantially flush with the left end face of the valve plunger 16.

An annular member 27 having an L-shaped cross section is disposed over the valve body 7. The annular member 27 includes a tubular portion 27a, representing the outer periphery of the member 27 and in which the flange-like portion 26b of the reaction transmitting member 26 is movably disposed, with the right end face of the tubular portion 27a abutting against the valve body 7.

A flange-like covering 27b is formed to extend radially inward from the left end of the tubular portion 27a of the annular member 27 so as to cover the flange-like portion 26b of the reaction transmitting member 26, with the left end face of the covering 27b opposing against the right end face of the reaction disc 25. The covering 27b is centrally formed with a through-opening 27c, in which the tubular portion 26a is slidably fitted, with the left end face of the tubular member 26a being disposed opposite to the reaction disc 25.

In the inoperative condition shown, a given clearance $l_3$ is formed between the right end face of the covering 27b of the annular member 27 and the left end face of the flange-like portion 26b of the reaction transmitting member 26, and is chosen such that when the reaction transmitting member 26 moves forward integrally with the valve plunger 16, an abutment of the flange-like portion 26b of the reaction transmitting member 26 against the covering 27b of the annular member 27 is avoided.

In operation, when a brake pedal, not shown, is depressed to drive the input shaft 24 and the valve plunger 16 to the left, the valve element 18 becomes seated upon the first valve seat 15 to interrupt a communication between the constant pressure chamber 5 and the variable pressure chamber 6 while causing the second valve seat 17 to move away from the valve element 18 to establish a communication of the variable pressure chamber 6 with the atmosphere. As a consequence, the atmospheric pressure is introduced into the variable pressure chamber 6, and the pressure differential across the power piston 3 causes the power piston 3 to be driven forward against the resilience of the return spring 10 in the same manner as in a conventional brake booster.

Under this condition, a reaction applied to the output shaft 9 causes an elastic deformation of the reaction disc 25 in the similar manner as in a conventional brake booster, whereby the clearance with respect to the left end face of the valve plunger 16 is reduced until the reaction disc 25 and the valve plunger 16 move into contact with each other. Thus, the reaction applied to the output shaft 9 is directly transmitted from the reaction disc 25 to the valve plunger 16, and thence to the brake pedal through the input shaft 24.

At the same time, under the described condition in which the brake is actuated, the second valve seat 17 on the valve plunger 16 will be driven forward beyond its movement away from the valve element 18, so that the step 16a of the valve plunger 16 abuts against the reaction transmitting member 26 to cause it to move forward integrally before the second valve seat 17 moves away from the valve element 18, as mentioned above. It will be seen that under this condition, at least for an intermediate loaded condition of the brake actuation, the abutment of the flange-like portion 26b of the reaction transmitting member 26 against the covering 27b of the annular member 27 to cause the latter to move forward is avoided, and accordingly that the reaction applied to the output shaft 9 will be transmitted to the valve plunger 16 through the reaction disc 25 and the reaction transmitting member 26.

As a consequence, under the brake actuated condition mentioned above, the reaction is directly transmitted from the reaction disc 25 to the valve plunger 16, and is simultaneously transmitted to the valve plunger 16 through the reaction transmitting member 26. Under this condition, the area of contact between the reaction disc 25 and the valve plunger 16 will be relatively large (see diameter D shown in FIG. 2), whereby a reaction of an increased magnitude is transmitted to the brake pedal, reducing the servo ratio as indicated by the straight line A shown in FIG. 3.

If the brake pedal is now released, the valve element 18 will be seated upon the second valve seat 17 in the valve mechanism 8, interrupting the communication between the atmosphere and the variable pressure chamber 6 while the valve element 18 moves away from the first valve seat 15 to communicate the variable pressure chamber 6 to the constant pressure chamber 5, whereby the power piston 3 will be returned to its original, inoperative position by the return spring 10.

Upon releasing the brake in this manner, the valve plunger 16 retracts to a position where the valve element 18 moves away from the first valve seat 15, and accordingly before this occurs, the reaction transmitting member 26 abuts against the valve body 7 to limit its retracting movement, thus isolating the valve plunger 16 from the reaction transmitting member 26. The reaction disc 25 continues to be elastically deformed by the reaction under this condition and continues to be maintained in abutment against the valve plunger 16, so that the reaction continues to be transmitted to the brake pedal. However, at this time, the area of contact between the reaction disc 25 and the valve plunger 16 will be relatively reduced (see diameter d shown in FIG. 2), whereby a reaction of a smaller magnitude is transmitted to the brake pedal, increasing the servo ratio as indicated by the dotted lines B in FIG. 3.

As mentioned previously, the annular reaction transmitting member 26 must have its inner periphery formed with a portion engageable with the valve plunger 16 and its outer periphery formed with a portion engageable with the valve body 7, and therefore requires a relatively increased radial width. If the annular member 27 is eliminated, and if the reaction transmitting member 26 is formed as a simple ring having a square cross section and having the increased radial width as in a conventional arrangement, the reaction transmitting member 26 will contact the reaction disc 25 over the entire radial width thereof, whereby the reaction of a greater magnitude will be transmitted thereto from the reaction disc 25, resulting in a greater difference in the servo ratios used upon actuating and releasing the brake, or a greater difference between the gradients of the lines A and B.

By contrast, in the present embodiment, the reaction transmitting member 26 is formed as an annular member having an L-shaped cross section, and as one having the flange-like portion 26b which is enagageable with the valve plunger 16 and the valve body 7 and which is surrounded by the covering 27b of the annular member 27. Consequently, the reaction disc 25 is allowed to contact only the left end face of the tubular portion 26a which represents the inner periphery of the reaction transmitting member 26.

Figure 3:
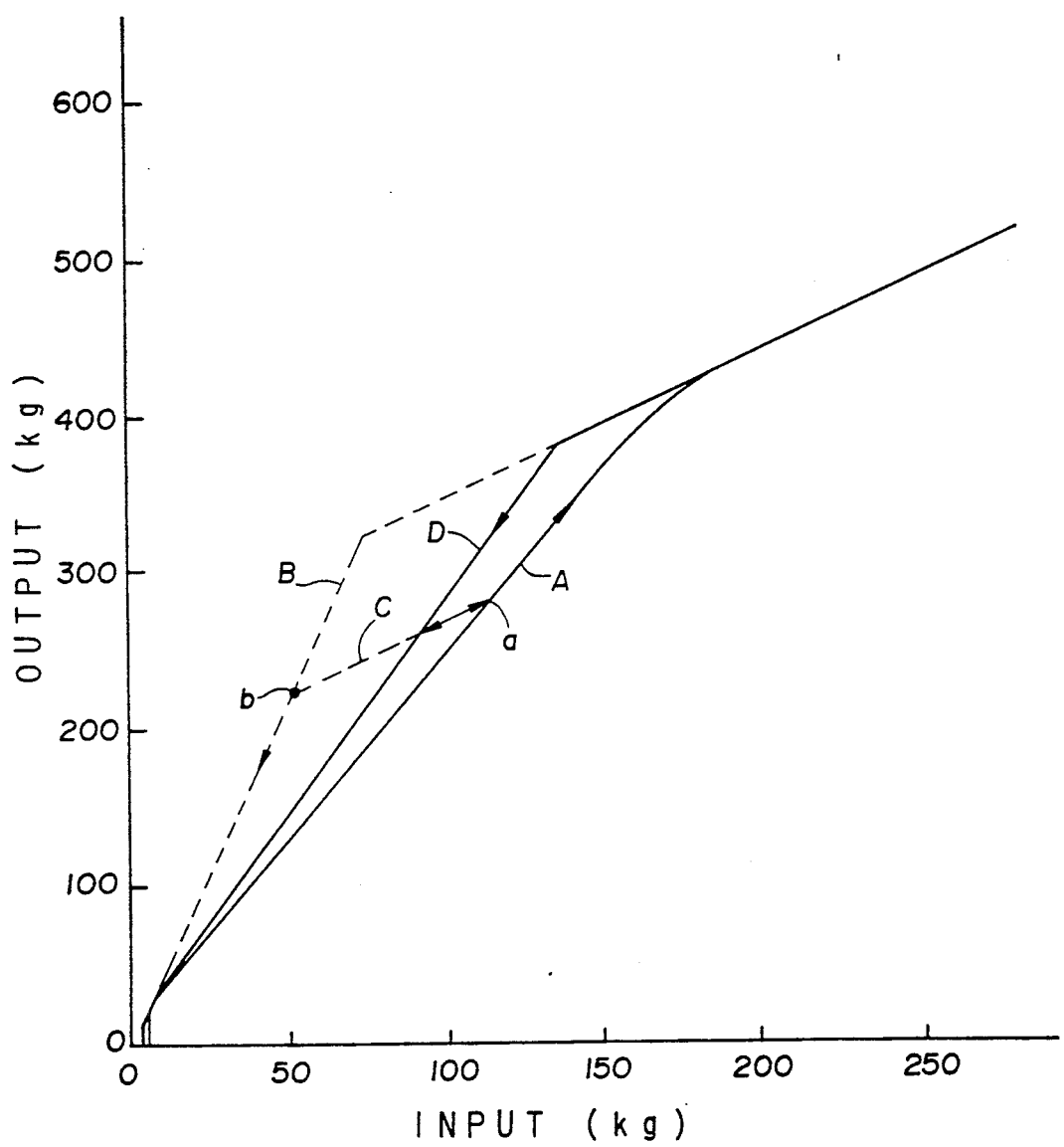
FIG. 3 graphically illustrates the characteristic curves of a reaction transmitting mechanism according to the invention and the conventional mechanism, the characteristic curve for the latter being shown in dotted lines.

Thus, referring to FIG. 3, the characteristic response upon actuating the brake is represented by the straight line A while the characteristic response upon releasing the brake is represented by the straight line D, thus allowing a difference between the both servo ratios to be reduced.

As an overall effect, the radial width at the left end face of the tubular portion 26a can be chosen small even though the radial width at the flange-like portion 26b of the reaction transmitting member 26 is larger, thus allowing the magnitude of the reaction transmitted from the reaction disc 25 to the reaction transmitting member 26 to be freely established. In other words, a difference between the servo ratio upon actuating the brake and the servo ratio upon releasing the brake can be arbitrarily chosen.

While the invention has been disclosed above in connection with the preferred embodiment thereof, it should be understood that a number of changes, modifications and substitutions therein will readily occur to one skilled in the art without departing from the spirit and scope of the invention defined by the appended claims.

What is claimed is:

1. A reaction transmitting mechanism for brake booster which comprises a valve mechanism responsive to a back-and-forth movement of a valve plunger mechanically coupled to an input shaft to exercise a controlling action upon opening or closing a flow path of a pressure fluid, an output shaft having its one end slidably fitted in a valve body in which the valve mechanism is received, a reaction disc interposed between the said one end of the output shaft and the valve plunger, and an annular reaction transmitting member reciprocably mounted on the valve body and interposed between the reaction disc and the valve plunger, the annular reaction transmitting member being arranged such that upon actuating a brake, the inner periphery of the reaction transmitting member engages the valve plunger to transmit a reaction from the reaction disc to the valve plunger while upon releasing the brake, the outer periphery of the reaction transmitting member engages the valve body to transmit a reaction from the reaction disc to the valve body;

the reaction transmitting mechanism being characterized in that the reaction transmitting member includes a tubular portion engageable with the valve plunger, and a flange-like portion extending radially outward from the end of the tubular portion opposite from the reaction disc and engageable with the valve body, an annular member being disposed over the valve body and including a covering which is interposed between the reaction disc and the flange-like portion of the reaction transmitting member so as to cover the flange-like portion, and a through-opening in which the tubular portion of the reaction transmitting member is slidably fitted.

2. A reaction transmitting mechanism according to claim 1 in which the inner peripheral portion of one end face of the flange-like portion of the reaction transmitting member is disposed opposite to a step in the valve plunger while the outer peripheral portion of said one end face of the flange-like portion is disposed opposite to the valve body, the annular-member having one end face disposed opposing against the valve body and its other end face disposed opposing against the reaction disc.

3. A reaction transmitting mechanism according to claim 2 in which the covering of the annular member comprises a flange-like portion which is formed on said other end of the annular member around its inner peripheral surface, the through-opening being formed in the axial portion of the covering in which the tubular portion of the reaction transmitting member is slidably fitted, the flange-like portion of the reaction transmitting member being disposed inside the tubular portion of the annular member.

4. A reaction transmitting mechanism according to claim 3 in which the brake booster has an inoperataive condition in which the outer peripheral portion of the one end face of the flange-like portion of the reaction transmitting member abuts against the valve body, and in which inoperative condition a clearance formed between the inner peripheral portion of the one end face of the flange-like portion and the step of the valve plunger is substantially equal to a distance by which the other end face of the tubular portion of the reaction transmitting member is axially spaced from the corresponding end face of the valve plunger.

5. A reaction transmitting mechanism according to claim 4 in which a given clearance is formed between the one end face of the covering of the annular member and the other end face of the flange-like portion of the reaction transmitting member, and is chosen such that when the reaction transmitting member moves forward integrally with the valve plunger, an abutment of the flange-like portion of the reaction transmitting member against the covering of the annular member is avoided.

* * * * *